United States Patent
Okuno et al.

(10) Patent No.: US 11,825,366 B2
(45) Date of Patent: Nov. 21, 2023

(54) INFORMATION PROCESSING APPARATUS, TRANSPORT EQUIPMENT, INFORMATION PROCESSING METHOD, AND COMPUTER-READABLE STORAGE MEDIUM

(71) Applicant: HONDA MOTOR CO., LTD., Tokyo (JP)

(72) Inventors: Yasuhiro Okuno, Tokyo (JP); Genesio Agostinho Gomes Chang, Tokyo (JP); Kazuya Kanekasu, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 199 days.

(21) Appl. No.: 17/453,860

(22) Filed: Nov. 8, 2021

(65) Prior Publication Data

US 2022/0210710 A1 Jun. 30, 2022

(30) Foreign Application Priority Data

Dec. 24, 2020 (JP) ................. 2020-215863

(51) Int. Cl.
*H04W 4/40* (2018.01)
*H04W 36/08* (2009.01)
(Continued)

(52) U.S. Cl.
CPC ............ *H04W 36/08* (2013.01); *H04W 4/40* (2018.02); *H04W 36/0061* (2013.01); *H04W 84/12* (2013.01)

(58) Field of Classification Search
CPC ... H04W 36/08; H04W 4/40; H04W 36/0061; H04L 2012/40273; H04L 2209/84
See application file for complete search history.

(56) References Cited

U.S. PATENT DOCUMENTS

| 11,637,782 B2* | 4/2023 | Tsuji ................. H04L 47/27 709/233 |
| 2020/0065087 A1* | 2/2020 | Miura .................. H04L 67/34 |

(Continued)

FOREIGN PATENT DOCUMENTS

JP 2020027643 A 2/2020

*Primary Examiner* — Shukri Taha

(57) ABSTRACT

An information processing apparatus mounted to transport equipment includes a processor that downloads a program of the information processing apparatus by a wireless communication, in which the information processing apparatus has communication modes including a first communication mode in which a wireless communication unit connects to a neighboring wireless access point and performs a communication and a second communication mode in which the wireless communication unit functions as a wireless access point for neighboring radio equipment, and, the processor performs a switching from the second communication mode to the first communication mode and searches for the neighboring wireless access point based on the first communication mode to attempt to connect to the neighboring wireless access point if the processor executes, when a power source of the transport equipment turns off, a discrimination of the communication mode and discriminates that the communication mode is the second communication mode.

20 Claims, 8 Drawing Sheets

(51) Int. Cl.
*H04W 36/00* (2009.01)
*H04W 84/12* (2009.01)

(56) References Cited

U.S. PATENT DOCUMENTS

2020/0114927 A1* 4/2020 Yokota .................. G06F 8/65
2021/0155176 A1  5/2021 Harata
2022/0210710 A1* 6/2022 Okuno .................. H04W 4/40

* cited by examiner

ND COMPUTER-READABLE STORAGE MEDIUM

The contents of the following Japanese patent application are incorporated herein by reference: Japanese Patent Application NO. 2020-215863 filed on Dec. 24, 2020.

BACKGROUND

1. Technical Field

The present invention relates to an information processing apparatus, transport equipment, an information processing method, and a computer-readable storage medium.

2 Related Art

Patent document 1 describes a system in which an application program such as a vehicle control or a diagnosis of an ECU mounted to a vehicle can be rewritten over the air (OTA).

LIST OF CITED REFERENCES

Patent Documents

[Patent document 1] Japanese Unexamined Patent Application, Publication No. 2020-27643

DESCRIPTION OF EXEMPLARY EMBODIMENTS

Hereinafter, the present invention will be described by way of embodiments of the invention, but the following embodiments are not intended to restrict the invention according to the claims. In addition, not all combinations of features described in the embodiments necessarily have to be essential to solving means of the invention.

Figure 1:
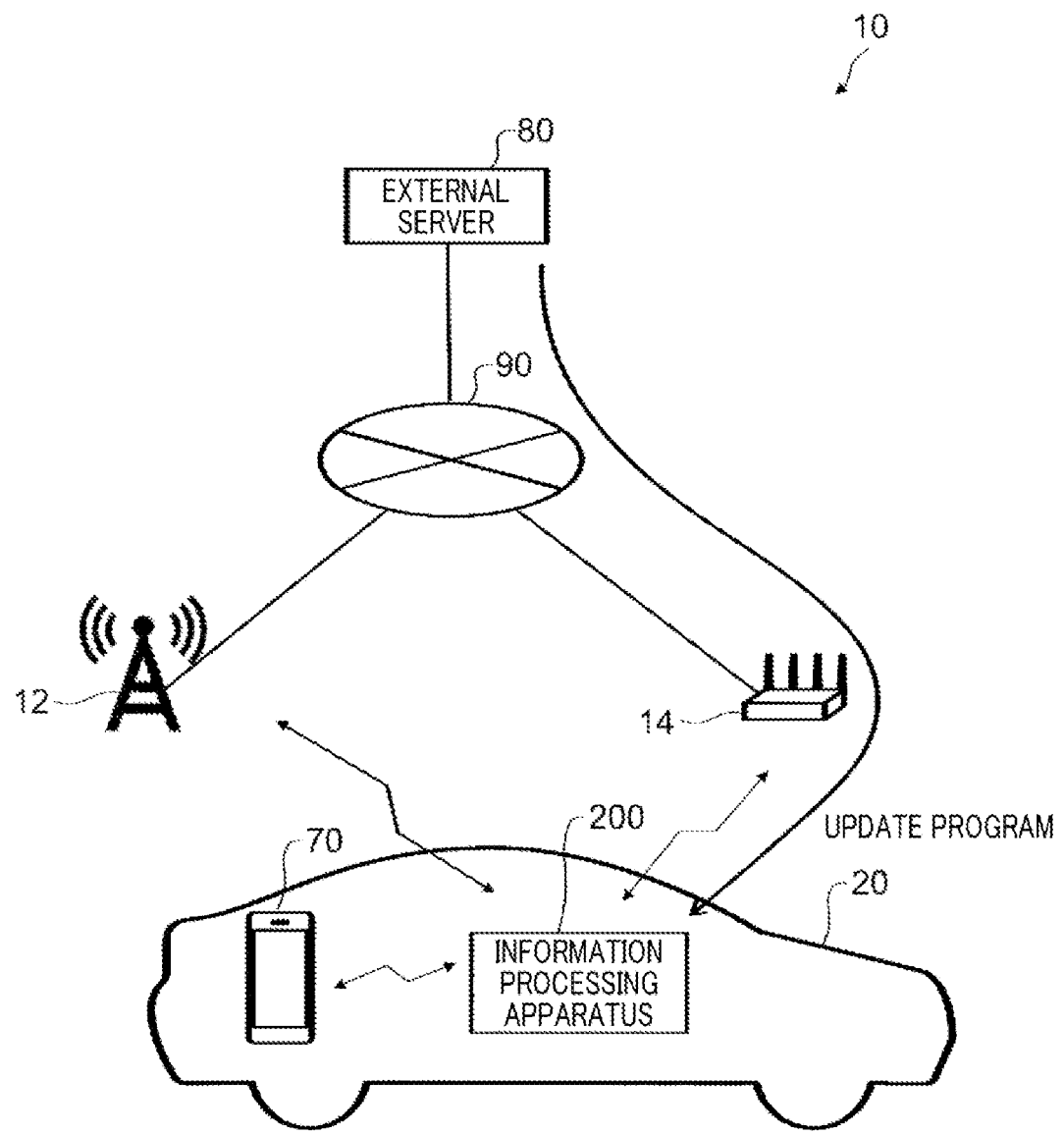
FIG. 1 schematically illustrates a program update system 10 according to one embodiment.

FIG. 1 schematically illustrates a program update system 10 according to one embodiment. The program update system 10 includes a vehicle 20 and an external server 80. The vehicle 20 includes an information processing apparatus 200. The information processing apparatus 200 is responsible for a control of the vehicle 20 and a communication with an external server 80 through a communication network 90. The communication network 90 includes an IP network such as the Internet, a P2P network, a dedicated line including a VPN, a virtual network, a mobile communication network, and the like.

A base station 12 and a wireless access point 14 are connected to the communication network 90. The base station 12 is a base station belonging to the mobile communication network. According to the present embodiment, the wireless access point 14 is a wireless local area network (wireless LAN) access point. The wireless access point 14 is, for example, a wireless LAN router installed at home of a user of the vehicle 20. The wireless access point 14 may be a wireless LAN router installed in a dealer. The wireless access point 14 may be a wireless access point installed in a car park or the like.

In the vehicle 20, the information processing apparatus 200 has a mobile communication function and a wireless LAN communication function. The information processing apparatus 200 includes a function of performing reprogramming of the information processing apparatus 200 over the air (OTA). The reprogramming is performed for a purpose of upgrade or the like of the function included in the information processing apparatus 200. For example, the information processing apparatus 200 receives an update program for replacing a program of the information processing apparatus 200 from the external server 80 through the communication network 90, by a wireless communication via the wireless access point 14 or the base station 12. The information processing apparatus 200 replaces the program of the information processing apparatus 200 with the received update program.

The information processing apparatus 200 has a station mode (STA mode) and an access point mode (AP mode) as communication modes of the wireless LAN communication. The AP mode is a communication mode in which the information processing apparatus 200 serves as a wireless access point. When the information processing apparatus 200 operates in the AP mode, the information processing apparatus 200 is connected to a wireless LAN node by a wireless LAN connection. For example, when the information processing apparatus 200 operates in the AP mode, the information processing apparatus 200 is connected to a terminal 70 possessed by the user of the vehicle 20 by a wireless LAN connection, and receives information stored in the terminal 70 to display the information. Note that the terminal 70 may be capable of performing a mobile communication through the base station 12. The terminal 70 is a mobile terminal such as a smartphone or a mobile phone.

The STA mode is a communication mode in which the information processing apparatus 200 connects to a neighboring wireless access point to perform a wireless LAN communication. When information is received through the communication network 90 through the wireless access point 14, the information processing apparatus 200 operates in the STA mode. For example, when an update program is received through the wireless access point 14, the information processing apparatus 200 operates in the STA mode and connects to the wireless access point 14 to receive the update program from the external server 80.

A case is considered in which while the vehicle 20 travels towards home of the user, for example, the information processing apparatus 200 operates in the AP mode and connects to the terminal 70, and receives and plays music data stored in the terminal 70. When the vehicle 20 arrives at home of the user, and the user turns off an ignition (IG) switch of the vehicle 20, an IG power source turns off, and the information processing apparatus 200 switches the communication mode from the AP mode to the STA mode and connects to the wireless access point 14. When the information processing apparatus 200 connects to the wireless access point 14, the information processing apparatus 200 inquires the external server 80 on the presence or absence of the update program, and when the update program is present, receives the update program from the external server 80. When download of the update program is completed, the information processing apparatus 200 switches the communication mode from the STA mode to the AP mode. Thereafter, when the IG power source turns on, the information processing apparatus 200 replaces the program of the information processing apparatus 200 with the update program, and starts the control.

In this manner, when the IG power source turns off, the information processing apparatus 200 connects to the wireless access point 14 and receives the update program. For this reason, the update program having a large data amount can be received through the wireless LAN communication at home or the like. In addition, when the information processing apparatus 200 switches the communication mode from the AP mode to the STA mode and connects to the wireless access point 14 to complete the download of the update program, the information processing apparatus 200 restores the communication mode to the AP mode. With this configuration, in a case where the IG power source is turned on next time, since the information processing apparatus 200 operates in the same communication mode as the communication mode when the IG power source is off, the user can connect the terminal 70 to the information processing apparatus 200 without performing an operation to switch the communication mode of the information processing apparatus 200. With this configuration, convenience of the user can be enhanced.

Figure 2:
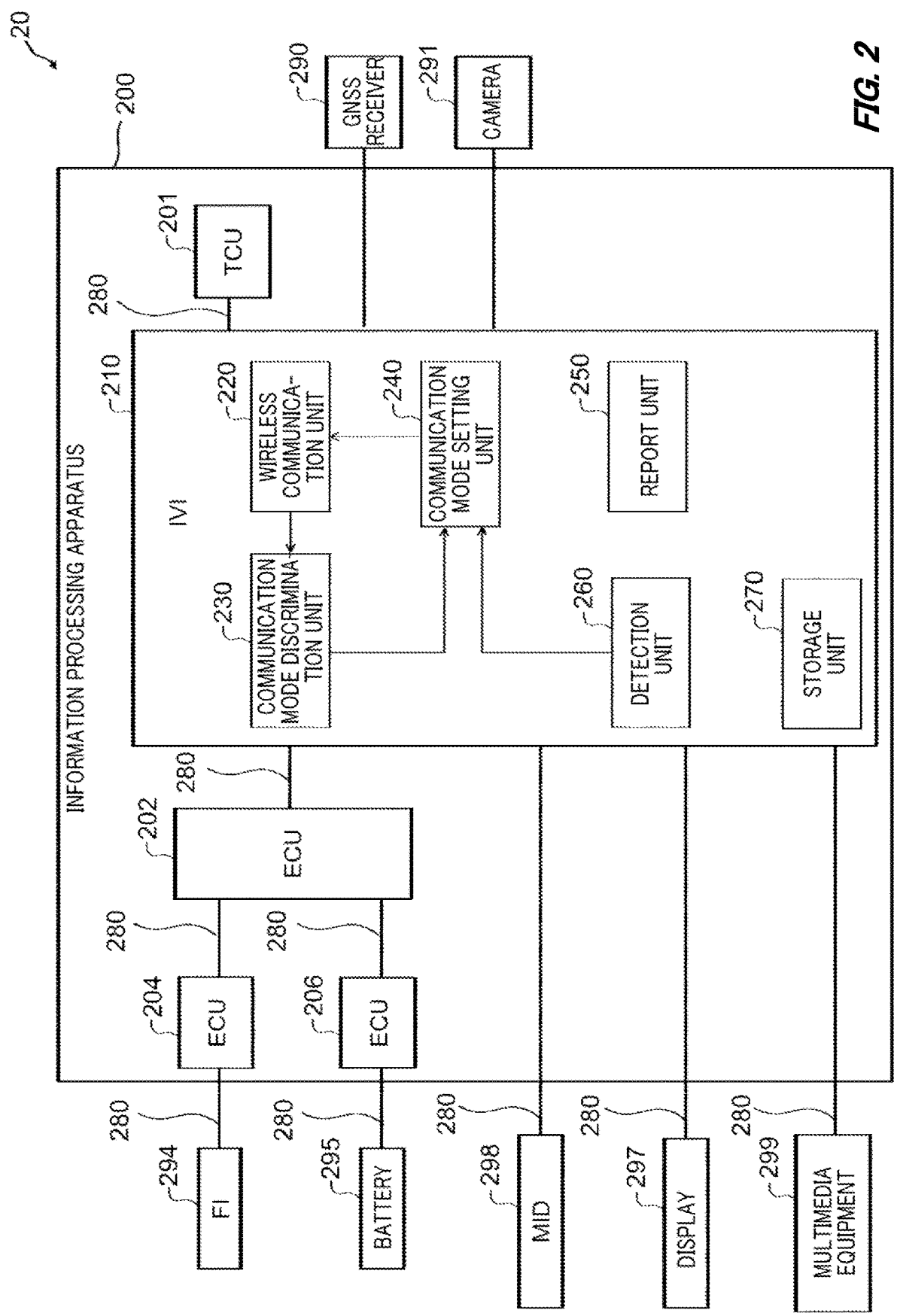
FIG. 2 schematically illustrates a system configuration of a vehicle 20.

FIG. 2 schematically illustrates a system configuration of the vehicle 20. The vehicle 20 includes a TCU 201, an ECU 202, an ECU 204, an ECU 206, an IVI 210, a display 297, a MID 298, multimedia equipment 299, a GNSS receiver 290, a camera 291, a battery 295, and an FI 294.

The TCU 201 is a telematics control unit. The IVI 210 is, for example, in-vehicle infotainment information equipment. The MID 298 is a multi-information display. The FI 294 is a fuel injection device. The vehicle 20 may include components other than the components illustrated in FIG. 2.

The TCU 201, the IVI 210, the ECU 202, the ECU 204, and the ECU 206 are communicably connected through an in-vehicle communication line 280. The TCU 201, the IVI 210, the ECU 202, the ECU 204, and the ECU 206 are configured to mutually communicate through the in-vehicle communication line 280. The in-vehicle communication line 280 may include a network or the like in conformity to a controller area network (CAN) or IEEE 802.3 series, for example.

The IVI 210 is connected to the TCU 201, the display 297, the MID 298, the multimedia equipment 299, the GNSS receiver 290, and the camera 291 via the in-vehicle communication line 280. The TCU 201 is mainly responsible for the mobile communication. The MID 298 and the display 297 are configured to function as a display unit. The multimedia equipment 299 includes, for example, a tuner, sound output equipment, and the like. The IVI 210 includes a wireless LAN communication function and a Bluetooth (registered trademark) communication function. The IVI 210 is configured to obtain location information from the GNSS receiver 290. The IVI 210 obtains image information from the camera 291. The IVI 210 displays navigation information on the display 297 based on the location information. The IVI 210 displays the image information obtained from the camera 291 on the display 297. The IVI 210 controls the multimedia equipment 299 to play music and display video on the display 297. The IVI 210 plays music and displays video on the display 297 based on information received from the terminal 70. The IVI 210 plays music and displays video on the display 297 based on information received from the outside through the communication network 90.

The ECU 204 and the ECU 206 are configured to control various types of equipment configured to control the vehicle 20. For example, the ECU 204 controls the FI 294. The ECU 206 controls the battery 295. The battery 295 is a battery for driving equipment mounted to the vehicle 20 including the information processing apparatus 200. The battery 295 is, for example, a lead storage battery of 12 V.

The IVI 210 receives the update program from the external server 80 by a wireless LAN communication. The wireless LAN communication is a wireless communication performed in accordance with, for example, IEEE 802.11 standards. Note that according to the present embodiment, descriptions will be provided while equipment set as a target of an OTA program update is the IVI 210.

The IVI 210 includes a wireless communication unit 220, a communication mode discrimination unit 230, a communication mode setting unit 240, a detection unit 260, a report unit 250, and a storage unit 270. The detection unit 260 is configured to detect a remaining capacity of the battery 295. The storage unit 270 stores a program for controlling the IVI 210. The IVI 210 operates according to the program stored in the storage unit 270.

The wireless communication unit 220 is configured to download a program installed in the information processing apparatus 200 from the external server 80 by a wireless communication. The information processing apparatus 200 has communication modes including a first communication mode in which the wireless communication unit 220 connects to a neighboring wireless access point and performs a communication, and a second communication mode in which the information processing apparatus 200 functions as the wireless access point for surrounding radio equipment. The second communication mode and the first communication mode are mutually exclusive for execution.

The communication mode discrimination unit 230 is configured to discriminate the communication mode of the wireless communication unit 220. The communication mode setting unit 240 is configured to execute a setting of the communication mode. Specifically, the wireless communication unit 220 includes a nonvolatile memory that stores operation setting information of the wireless communication unit 220, and the communication mode setting unit 240 switches the communication mode of the wireless communication unit 220 by rewriting a set value for designating the communication mode of the wireless communication unit 220 in the operation setting information. The wireless communication unit 220 sets the communication mode according to the set value of the operation setting information at the time of activation of the IVI 210. Note that according to the present embodiment, a case will be mainly described in which the wireless communication is the wireless LAN communication, the first communication mode is the STA mode, and the second communication mode is the AP mode.

When a power source of the vehicle 20 turns off, the communication mode discrimination unit 230 executes the discrimination on the communication mode of the wireless communication unit 220. For example, when the IG power source of the vehicle 20 turns off, the communication mode discrimination unit 230 executes the discrimination on the communication mode of the wireless communication unit 220. When the communication mode discrimination unit 230 discriminates that the communication mode is the second communication mode, the communication mode setting unit 240 is configured to perform the switching from the second communication mode to the first communication mode, and the wireless communication unit 220 is configured to search for a neighboring wireless access point based on the first communication mode and attempt to connect to the neighboring wireless access point.

With this configuration, in a case where the communication mode of the wireless communication unit 220 is the second communication mode when the power source is off, by switching the communication mode to the first communication mode, it is possible to connect to the neighboring wireless access point and communicate with the external server 80 that distributes the update program. With this configuration, the information processing apparatus 200 checks with the external server 80 on the presence or absence of the update program, and when the update program is present, can download the update program by the wireless LAN communication.

When the communication mode setting unit 240 performs the switching from the second communication mode to the first communication mode, and the wireless communication unit 220 searches for the neighboring wireless access point based on the first communication mode to attempt to connect to the neighboring wireless access point, but fails to connect to the neighboring wireless access point, the communication mode setting unit 240 is configured to perform the switching from the first communication mode to the second communication mode. With this configuration, after the attempt of the connection to the wireless access point, since it is possible to restore the communication mode of the wireless communication unit 220 to the same communication mode as the communication mode when the power source is off, the terminal 70 can be caused to promptly establish a wireless connection to the information processing apparatus 200 when the power source is turned on next time. With this configuration, the convenience of the user can be enhanced.

After the communication mode setting unit 240 performs the switching from the second communication mode to the first communication mode, and the wireless communication unit 220 searches for the neighboring wireless access point based on the first communication mode to attempt to connect to the neighboring wireless access point and establishes a connection to the neighboring wireless access point, when it is determined that the download of the program is not necessary, the communication mode setting unit 240 is configured to perform the switching from the first communication mode to the second communication mode. With this configuration, after it is confirmed as to whether the download of the update program from the external server 80 is necessary, since it is possible to restore the communication mode of the wireless communication unit 220 to the same communication mode as the communication mode when the power source is off, the terminal 70 can be caused to promptly establish a wireless connection to the information processing apparatus 200 when the power source is turned on next time. With this configuration, the convenience of the user can be enhanced.

After the communication mode setting unit 240 performs the switching from the second communication mode to the first communication mode, and the wireless communication unit 220 searches for the neighboring wireless access point based on the first communication mode and establishes a connection to the neighboring wireless access point, when it is determined that the download of the program cannot be performed under a predetermined condition, the communication mode setting unit 240 is configured to perform the switching from the first communication mode to the second communication mode. With this configuration, when the update program cannot be download from the external server 80, since it is possible to restore the communication mode of the wireless communication unit 220 to the same communication mode as the communication mode when the power source is off, the terminal 70 can be caused to promptly establish a wireless connection to the information processing apparatus 200 when the power source is turned on next time. With this configuration, the convenience of the user can be enhanced. Note that the predetermined condition includes that the remaining capacity of the battery 295 which is detected by the detection unit 260 is lower than a predetermined value. With this configuration, while the battery 295 is protected, the number of triggers for updating the program can be increased.

When the communication mode setting unit 240 performs the switching from the second communication mode to the first communication mode, and the wireless communication unit 220 searches for the neighboring wireless access point based on the first communication mode and establishes a connection to the neighboring wireless access point to complete the download of the program, the communication mode setting unit 240 is configured to perform the switching from the first communication mode to the second communication mode. With this configuration, when the download of the update program from the external server 80 is completed, since it is possible to restore the communication mode of the wireless communication unit 220 to the same communication mode as the communication mode when the power source is off, the terminal 70 can be caused to promptly establish a wireless connection to the information processing apparatus 200 when the power source is turned on next time. With this configuration, the convenience of the user can be enhanced.

When the communication mode setting unit performs the switching from the second communication mode to the first communication mode, and the wireless communication unit searches for the neighboring wireless access point based on the first communication mode, establishes a connection to the neighboring wireless access point, and starts the download of the program from the external server, but the download of the program from the external server is not completed within a predetermined period of time, the download of the program is stopped, and the communication mode setting unit is configured to perform the switching from the first communication mode to the second communication mode. With this configuration, when the download of the update program from the external server 80 is stopped, since it is possible to restore the communication mode of the wireless communication unit 220 to the same communication mode as the communication mode when the power source is off, it is possible to set the communication mode when the power source is turned on next time as the second communication mode in which the terminal 70 can be caused to promptly establish a wireless connection to the information processing apparatus 200. With this configuration, the convenience of the user can be enhanced.

The IVI 210 obtains information to be displayed on the display 297 from the terminal 70 based on the second communication mode. With this configuration, while the power source of the vehicle 20 is on, when the power source of the vehicle 20 is turned off in a state where the information obtained from the terminal 70 based on the second communication mode is displayed on the display 297, the second communication mode is switched to the first communication mode to attempt to connect to the wireless access point, and then the communication mode is switched to the second communication mode. With this configuration, since a state is established where the information can be promptly obtained from the terminal 70 when the power source is turned on next time, the convenience of the user can be enhanced.

When the download of the program is not completed, the report unit 250 reports that the download is not completed after the power source of the vehicle 20 is turned on. For example, the report unit 250 displays an effect that the download is not completed on at least one of the display 297 and the MID 298. With this configuration, when the user is notified that the download is not completed while the power source is on, it is possible to set such that the information processing apparatus 200 downloads the program using a tethering function of the terminal 70. For example, the user performs an operation for switching the communication mode of the information processing apparatus 200 to the first communication mode and causes the information processing apparatus 200 to establish a wireless LAN connection to the terminal 70, so that the information processing apparatus 200 can download the program from the external server 80 through the terminal 70. With this configuration, the number of opportunities for updating the program of the information processing apparatus 200 can be increased.

The information processing apparatus 200 has a third communication mode in which a communication is performed using a mobile communication. The mobile communication is realized by the TCU 201. When the mobile communication is available, the information processing apparatus 200 may download the program using the mobile communication in a preferential manner over the wireless communication based on the second communication mode. With this configuration, when the mobile communication is available, a file for the update can be promptly downloaded without connecting to the wireless access point.

Figure 3:
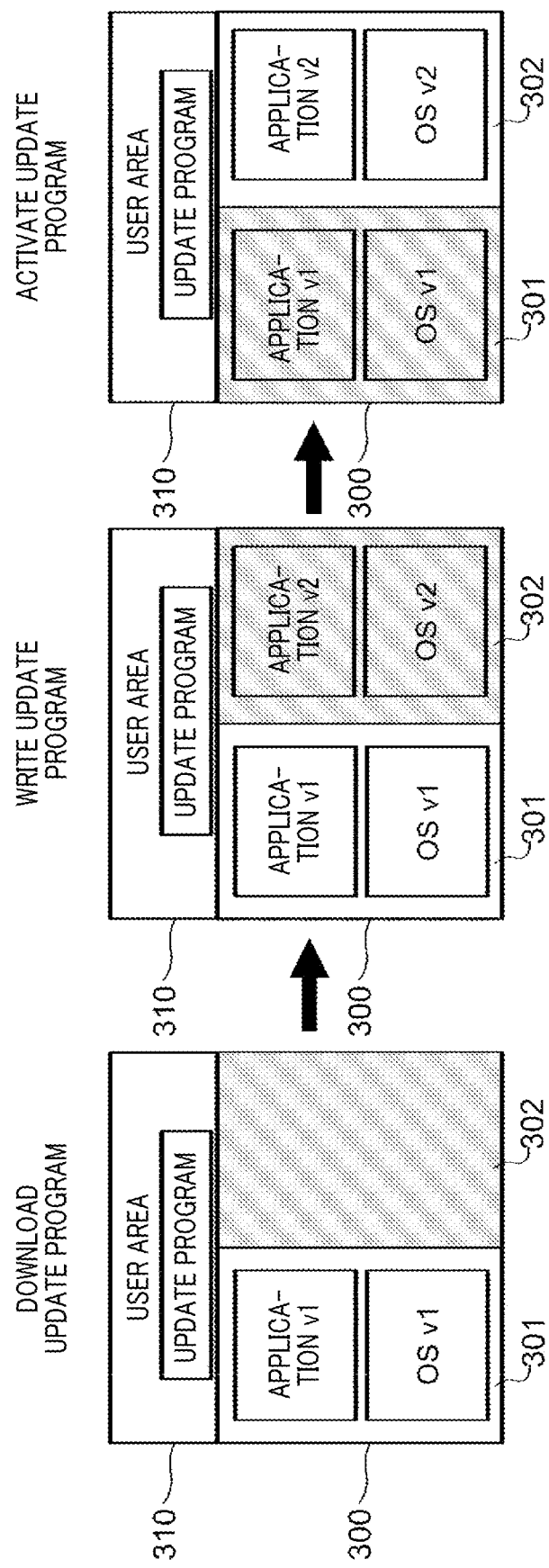
FIG. 3 is a diagram for schematically describing a program update of an information processing apparatus 200.

FIG. 3 is a diagram for schematically describing a program update of the information processing apparatus 200. FIG. 3 illustrates information stored in the storage unit 270 when a program update of the IVI 210 is performed. The storage unit 270 has a system area 300 and a data area 310.

The system area 300 is a storage area in which firmware including an operating system (OS) and an application program is stored. The data area 310 is a storage area in which user data is stored. For example, the data area 310 stores telephone book data or setting data of the application program.

The system area 300 has a first partition 301 and a second partition 302. The IVI 210 activates the OS store in one partition out of the first partition 301 and the second partition 302. A predetermined storage area of the storage unit 270 stores information indicating one partition effective as an activation partition out of the first partition 301 and the second partition 302, and the IVI 210 activates the OS stored in the effective partition.

First, it is assumed that the first partition 301 is set as the effective partition, and the IVI 210 operates according to the OS stored in the first partition 301. The IVI 210 stores the update program downloaded from the external server 80 in the data area 310. The update program is, for example, an image file of the firmware to be written in one partition out of the first partition 301 and the second partition 302.

When the program update of the IVI 210 is performed by the update program, the IVI 210 writes the update program in the second partition 302. When the write of the update program in the second partition 302 is completed, the update program is activated. Specifically, the IVI 210 enables the second partition 302 in which the update program is written as the activation partition, disables the first partition 301 as the activation partition, and activates the OS stored in the second partition 302. With this configuration, the program update of the IVI 210 is completed.

In FIG. 3, the case has been described where the first partition 301 is set for the partition effective as the activation partition. When the second partition 302 is set for the partition effective as the activation partition, the program update is performed in such a manner that after the update program is written in the first partition 301, the first partition 301 is enabled as the activation partition, and the second partition 302 is disabled as the activation partition.

Figure 4:
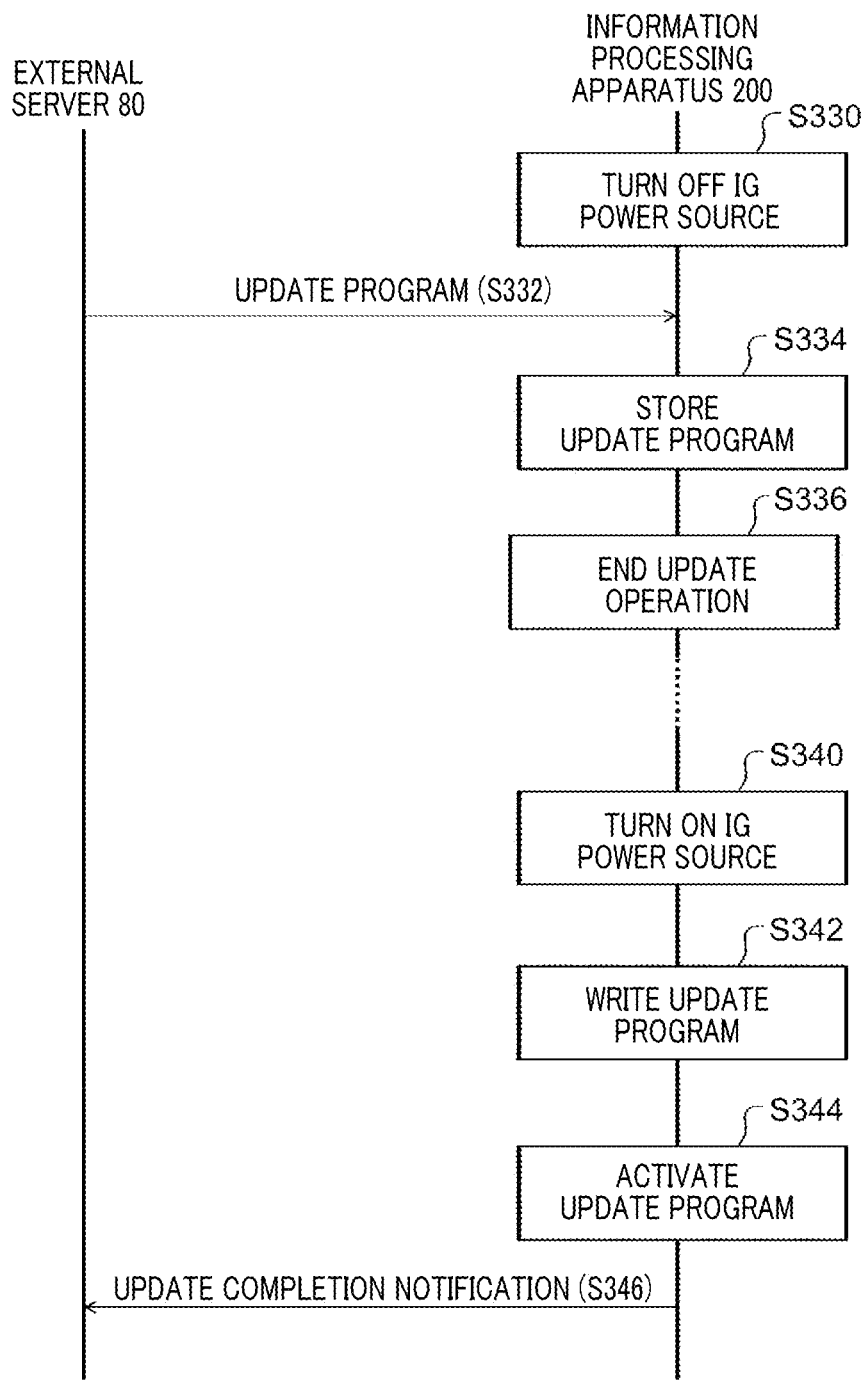
FIG. 4 illustrates an execution sequence related to processing for updating a program of the information processing apparatus 200.

FIG. 4 illustrates an execution sequence related to processing for updating the program of the information processing apparatus 200. In S330, when the user performs an operation for turning off the IG power source of the vehicle 20, the IG power source is turned off, and the IVI 210 downloads the update program from the external server 80 (S332), and stores the update program (S334). Specifically, as described in association with FIG. 3, the IVI 210 stores the update program in the data area 310, and ends the update operation (S336).

Thereafter, when the user performs an operation for turning on the IG power source in S340, the IG power source is turned on, and the IVI 210 writes the update program (S342), and activates the update program (S344). For example, when the first partition 301 is set for the partition effective as the activation partition as described in association with FIG. 3, the IVI 210 writes the update program in the second partition 302, enables the second partition 302 as the activation partition, disables the first partition 301 as the activation partition, and activates the OS of the update program.

Subsequently, the IVI 210 transmits a completion notification indicating that the update is completed to the external server 80 (S346).

Figure 5:
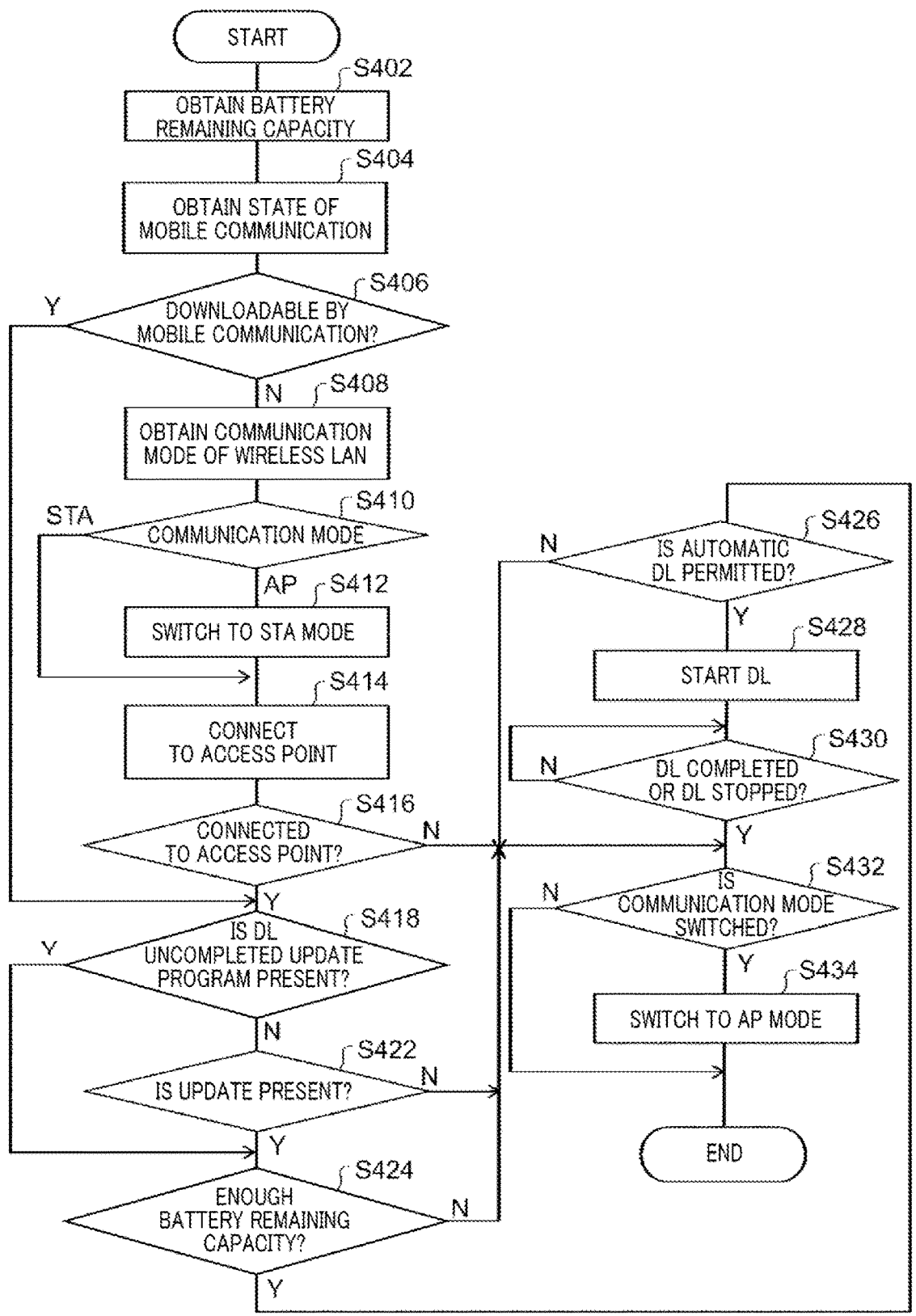
FIG. 5 is a flowchart illustrating a processing procedure related to the update of the program of the information processing apparatus 200.

FIG. 5 is a flowchart illustrating a processing procedure related to the program update of the information processing apparatus 200. Processing of the flowchart illustrated in FIG. 5 is started when the user performs the operation for turning off the IG power source of the vehicle 20. The processing of the flowchart of FIG. 5 includes processing corresponding to S334 and S336 of FIG. 4.

When the user performs the operation for turning off the IG power source of the vehicle 20, in S402, the detection unit 260 detects the remaining capacity of the battery 295. Subsequently, in S404, the IVI 210 obtains a state of the mobile communication. Specifically, the IVI 210 identifies whether a TCU is mounted to the vehicle 20, and obtains a connection status between the TCU and a base station of the mobile communication network when the TCU is mounted to the vehicle 20.

In S406, it is determined as to whether the update program is downloadable by the mobile communication. Specifically, the IVI 210 determines whether the TCU is mounted to the vehicle 20, and also whether the TCU is connected to the base station, and also whether the download of the update program by the mobile communication is permitted. Whether the download of the update program by the mobile communication is permitted by the external server 80 may be set for each of the vehicles 20. Whether the download of the update program by the mobile communication is permitted by the external server 80 may be notified from the external server 80 based on an importance of the update program to be provided to the information processing apparatus 200, a program size of the update program, or the like. According to the present embodiment, since the TCU 201 is mounted to the vehicle 20, in S406, when the TCU 201 is connected to the base station, and also the download of the update program by the mobile communication is permitted, it is determined that the update program is downloadable by the mobile communication. When the update program is downloadable by the mobile communication, the flow proceeds to S418, and when the update program is not downloadable by the mobile communication, the flow proceeds to the processing in S408.

In S408, the communication mode discrimination unit 230 obtains a current communication mode of the wireless LAN of the wireless communication unit 220. In S410, the communication mode discrimination unit 230 discriminates whether the communication mode of the wireless communication unit 220 is the STA mode or the AP mode. When the communication mode of the wireless communication unit 220 is the STA mode, the flow proceeds to S414, and when the communication mode of the wireless communication unit 220 is the AP mode, the flow proceeds to processing in S412.

In S412, the communication mode setting unit 240 switches the communication mode of the wireless communication unit 220 to the STA mode. Subsequently, in S414, the wireless communication unit 220 attempts to connect to the wireless access point. Specifically, the wireless communication unit 220 searches for a connectable wireless access point, and when the connectable wireless access point is discovered, requests the wireless access point for a connection. Note that in S414, the wireless communication unit 220 may search for a wireless access point other than the wireless access point provided by the tethering function of the terminal 70. Identification information of the wireless access point provided by the tethering function of the terminal 70 may be registered in the IVI 210 by the user. The identification information of the wireless access point may be an access point identification name (for example, an SSID) or the like.

In S416, the wireless communication unit 220 determines whether the connection to the wireless access point is established. When the connection to the wireless access point is not established, the flow proceeds to S432, and when the connection to the wireless access point is established, the flow proceeds to S418.

In S418, the IVI 210 determines whether an update program the download of which is uncompleted is present. Specifically, the IVI 210 determines whether the update program in a download uncompleted state is stored in the data area 310. The IVI 210 may determine whether the download is uncompleted based on whether a program size of the update program is matched with a size of the update program stored in the data area 310. The program size of the update program may be included in a distribution package including the update program transmitted from the external server 80. When the update program the download of which is uncompleted is present, the flow proceeds to S424, and when the update program the download of which is uncompleted is not present, the flow proceeds to S422. In S422, the presence or absence of the update program is discriminated. When the update program is absent, the flow proceeds to S432, and when the update program is present, the flow proceeds to S424.

In S424, the IVI 210 determines whether the remaining capacity of the battery 295 is higher than or equal to a predetermined value. When the remaining capacity of the battery 295 is lower than the predetermined value, the flow proceeds to S432, and when the remaining capacity of the battery 295 is higher than or equal to the predetermined value, the flow proceeds to S426.

In S426, the IVI 210 determines whether automatic download of the update program is permitted. For example, the IVI 210 determines whether the information processing apparatus 200 is permitted to automatically download the update program based on a user setting. By enabling the setting for permitting the automatic download of the update program by the user setting, the number of opportunities for downloading the update program can be increased. When the automatic download of the update program is permitted, the flow proceeds to S428, and when the automatic download of the update program is not permitted, the flow proceeds to S432.

In S428, the IVI 210 starts the download of the update program. Specifically, the IVI 210 downloads the update program from the external server 80 by the wireless communication of the wireless communication unit 220 or the TCU 201. In S430, the IVI 210 determines whether the download of the update program is completed or the download of the update program is to be stopped. For example, when a program size of the update program is obtained from the external server 80, and the size of the update program received from the external server 80 reaches the program size received from the external server 80, the IVI 210 determines that the download of the update program is completed. On the other hand, when a predetermined download time elapses since the start of the download of the update program, the IVI 210 determines that the download of the update program is to be stopped. The download time is a predetermined time for protecting the battery 295. The download time is a time in which power can be supplied from the battery 295 for downloading the update program, for example. The download time may be set in accordance with the remaining capacity of the battery 295. The download time may be set in accordance with a degree of deterioration of the battery 295. The download time may be a predetermined regular time. When the download of the update program is not ended, the determination of S430 is repeated, and when the download of the update program is to be ended, the flow proceeds to S432.

In S432, the IVI 210 determines whether the switching to the STA mode is performed in S412. When the switching to the STA mode is not performed, the flow proceeds to S436, and when the switching to the STA mode is performed, the flow proceeds to S434. In S434, the communication mode setting unit 240 switches the communication mode of the wireless communication unit 220 to the AP mode, and the processing is ended.

Figure 6:
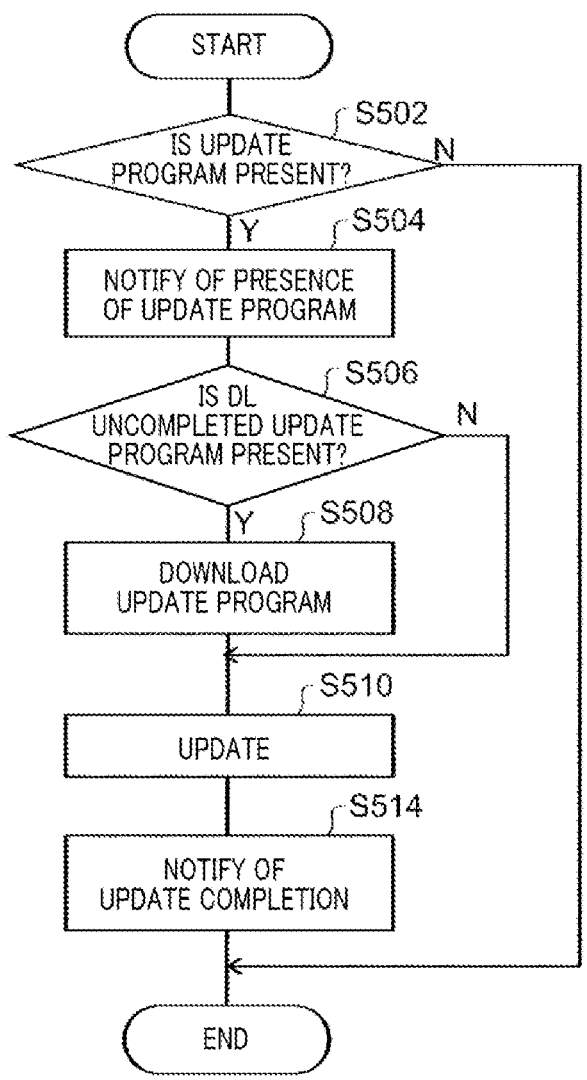
FIG. 6 is a flowchart illustrating a processing procedure related to the update of the program of the information processing apparatus 200.

FIG. 6 is a flowchart illustrating the processing procedure related to the program update of the information processing apparatus 200. Processing of the flowchart illustrated in FIG. 6 is started when the user performs the operation for turning on the IG power source of the vehicle 20. The processing of the flowchart of FIG. 6 includes processing corresponding to S342 to S346 of FIG. 4.

By the operation for turning on the IG power source, the IG power source of the vehicle 20 and the IVI 210 are turned on. Note that when a power source state of the IVI 210 is put into an on state, the communication mode of the wireless communication unit 220 is set as the same communication mode as the communication mode when the IVI 210 is put into an off state last time. In S502, the IVI 210 determines whether the update program of the information processing apparatus 200 is present. For example, the IVI 210 determines whether the update program is present in the data area 310. When the update program is not present, the processing of this flowchart is ended, and when the update program is present, the flow proceeds to S504.

In S504, the IVI 210 notifies the user that the update program of the information processing apparatus 200 is present. Specifically, the IVI 210 displays information indicating that the update program of the information processing apparatus 200 is present on the display 297 and the MID 298 and notifies the user of the information.

Subsequently, in S506, the IVI 210 determines whether an update program the download of which is uncompleted is present. Specifically, the IVI 210 determines whether the update program stored in the data area 310 is in the download uncompleted state. The IVI 210 may perform the determination in S506 by processing similar to the processing described in association with S418 of FIG. 4. When the update program the download of which is uncompleted is present, the flow proceeds to S508, and when the update program the download of which is uncompleted is not present, the flow proceeds to S510.

In S508, the wireless communication unit 220 downloads the update program from the external server 80. Note that in S508, the update program may be downloaded by performing processing similar to the processing in S402 to S434 of FIG. 4.

In S510, the IVI 210 performs the program update by the update program. Specifically, as described in association with FIG. 3 or the like, write of the update program and activation of the update program are performed. Subsequently, in S514, the IVI 210 notifies the user that the update is completed. In addition, the IVI 210 notifies the external server 80 of an update completion notification indicating that the update is completed. When the processing in S514 is completed, the processing of this flowchart is ended, and the user can use a function of the IVI 210 such as music.

According to the processing of the flowcharts described with reference to FIG. 5 and FIG. 6, when the update program is downloaded by switching the communication mode of the wireless communication unit 220 from the AP mode to the STA mode in S412, the communication mode is restored to the AP mode in S434, and the operation is ended. On the other hand, when the communication mode of the wireless communication unit 220 is not switched from the AP mode to the STA mode in S412, the operation is ended while the communication mode remains the STA mode. With this configuration, since the communication mode when the IG power source is turned on next time can be matched with the communication mode when the IG power source is turned off by the user last time, the convenience of the user can be enhanced.

Figure 7:
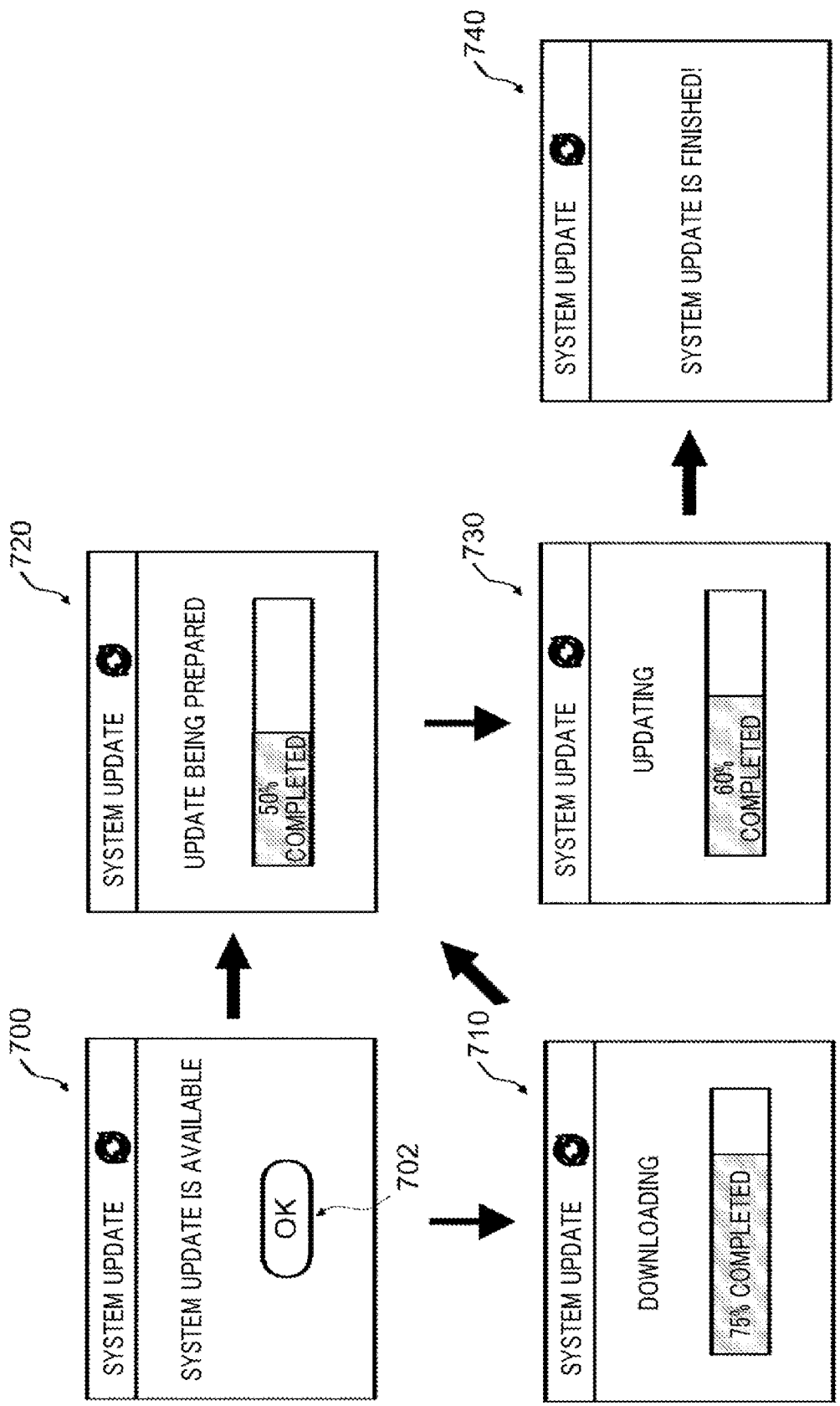
FIG. 7 schematically illustrates a notification screen related to the program update which is displayed on a display 297.

FIG. 7 schematically illustrates a notification screen related to the program update which is displayed on the display 297. The IVI 210 displays a screen 700, a screen 710, a screen 720, and a screen 730 on the display 297 in accordance with a processing status.

The screen 700 is a screen for notifying the user that the update program is present. The screen 700 is displayed, for example, in S504 of the flowchart of FIG. 6. The screen 700 includes a UI button 702 for the user to instruct an execution of the update by the update program. After the UI button 702 is operated, when the update program the download of which is uncompleted is present, transition to the screen 710 occurs, and when the update program the download of which is uncompleted is not present, transition to the screen 720 occurs.

The screen 710 is a screen indicating that the update program is being downloaded. When the download of the update program is completed, transition to the screen 720 occurs. The screen 720 is a screen indicating that the update by the update program is being prepared. For example, the screen 720 is a screen displayed during the write of the update program in S510 of FIG. 6.

When the write of the update program is completed, transition to the screen 730 occurs. The screen 730 is a screen indicating that the update by the update program is being executed. For example, the screen 730 is a screen displayed during the activation of the update program in S510 of FIG. 6. Note that the IVI 210 may display a screen for obtaining an instruction to execute the update by the update program from the user before transition from the screen 720 to the screen 730 occurs.

When the activation of the update program is completed, transition to the screen 740 occurs. The screen 740 is a screen for notifying the user that the update is completed. The IVI 210 transmits the update completion notification to the external server 80 while the screen 740 is displayed. When the IVI 210 fails to transmit the update completion notification to the external server 80 while the screen 740 is displayed, the IVI 210 may transmit the update completion notification when a connection to the external server 80 is established next time.

According to the embodiment described above, when the IG power source is turned off, since the IVI 210 connects to the wireless access point and receives the update program, the update program having a large data amount can be received through a wireless LAN line installed at home or the like. In addition, the IVI 210 switches the communication mode from the AP mode to the STA mode and connects to the wireless access point, and when the download of the update program is completed, the communication mode is restored to the AP mode, and the operation is ended, so that when the IG power source is turned on next time, the operation can be started in the same communication mode as the communication mode when the IG power source is off. Therefore, the user can connect the terminal 70 to the IVI 210 without performing the operation for switching the communication mode of the IVI 210, for example. With this configuration, the convenience of the user can be enhanced.

According to the present embodiment, the equipment set as the target of the OTA program update is the IVI 210. However, the equipment set as the target of the OTA program update may be any equipment in the vehicle 20 such as the ECU 202, the ECU 204, and the ECU 206 in addition to the IVI 210.

According to the present embodiment, the case has been described where the program update is performed for a so-called two-sided ROM having memory banks for programs on two sides like the first partition 301 and the second partition 302. However, an aspect related to the switching of the above-mentioned communication mode can also be applied to a case where the program update is performed for a one-sided ROM, for example, irrespective of the number of memory banks.

The wireless LAN communication described in association with the present embodiment described above is one example of the "wireless communication". The wireless LAN communication may be a Wi-Fi (registered trademark)

communication performed between devices authenticated by Wi-Fi Alliance to be mutually connected. The "wireless communication" is not limited to the wireless LAN. As the "wireless communication", any wireless communication can be applied where communication modes are set including a first communication mode in which a device connects to a neighboring wireless access point for communication and a second communication mode in which the device itself functions as a wireless access point.

The vehicle 20 described according to the present embodiment is one example of transport equipment. The vehicle serving as one example of the transport equipment includes a four-wheeled automobile, a two-wheeled automobile, a saddle type vehicle, and the like. The vehicle serving as one example of the transport equipment may be any type of vehicles such as a cart and a rail vehicle. As the transport equipment, equipment that transports at least one of a person and an article can be exemplified such as a snow mobile, a farm machine, a marine vessel, and an airplane including an uninhabited airborne vehicle.

Figure 8:
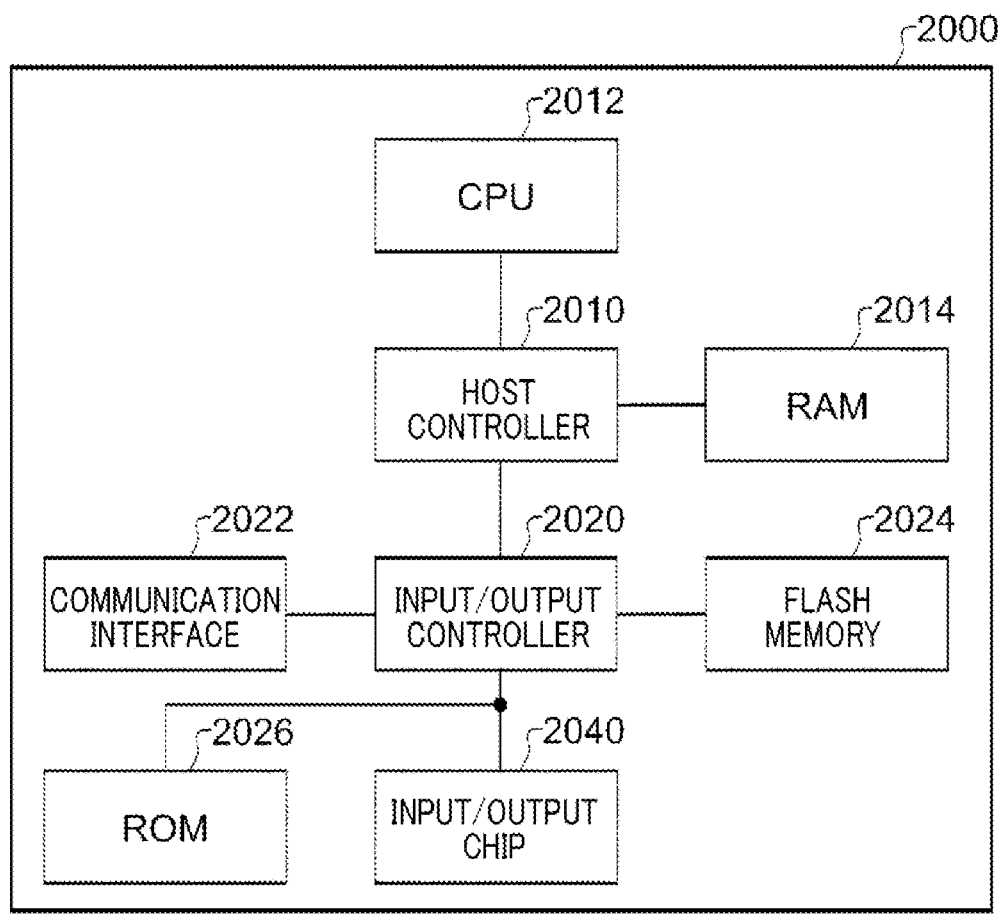
FIG. 8 illustrates an example of a computer 2000.

FIG. 8 illustrates an example of a computer 2000 where a plurality of embodiments of the present invention may be entirely or partially embodied. Programs installed in the computer 2000 can cause the computer 2000 to: function as apparatuses such as the information processing apparatus according to the embodiments, or each unit of the apparatuses; execute operations associated with the apparatuses or each unit of the apparatuses; and/or execute a process according to the embodiments or steps of the process. Such programs may be executed by a central processing unit (CPU) 2012 in order to cause the computer 2000 to execute a specific operation associated with some or all of the processing procedures and the blocks in the block diagram described in this specification.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to the programs stored in the ROM 2026 and the RAM 2014, thereby controlling each unit.

The communication interface 2022 communicates with other electronic devices via a network. The flash memory 2024 stores the programs and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a universal serial bus (USB) port, a high-definition multimedia interface (HDMI (registered trademark)) port.

The programs are provided via a network or a computer-readable storage medium such as a CD-ROM, a DVD-ROM, or a memory card. The RAM 2014, the ROM 2026, or the flash memory 2024 is an example of the computer-readable storage medium. The programs are installed in the flash memory 2024, the RAM 2014 or the ROM 2026, and are executed by the CPU 2012. Information processing written in these programs is read by the computer 2000, and provides cooperation between the programs and the various types of hardware resources described above. An apparatus or a method may be configured by implementing operation or processing of information according to a use of the computer 2000.

For example, when communication is performed between the computer 2000 and an external device, the CPU 2012 may execute a communication program loaded in the RAM 2014, and instruct the communication interface 2022 to execute communication processing, based on processing written in the communication program. The communication interface 2022, under the control of the CPU 2012, reads transmission data stored in a transmission buffer processing region provided in a recording medium such as the RAM 2014 and the flash memory 2024, sends the read transmission data to the network, and writes reception data received from the network into a reception buffer processing region or the like provided on the recording medium.

Moreover, the CPU 2012 may cause all or necessary portion of a file or a database stored in the recording medium such as the flash memory 2024 or the like, to be read by the RAM 2014, and execute various types of processing on the data on the RAM 2014. Next, the CPU 2012 writes back the processed data into the recording medium.

Various types of programs and various types of information such as data, a table, and a database may be stored in the recording medium, and subjected to information processing. The CPU 2012 may execute, on the data read from the RAM 2014, various types of processing including various types of operations, information processing, conditional judgement, conditional branching, unconditional branching, information retrieval/replacement, or the like described in this specification and specified by instruction sequences of the programs, and writes back the results into the RAM 2014. Moreover, the CPU 2012 may retrieve information in a file, a database, or the like in the recording medium. For example, when a plurality of entries each having an attribute value of a first attribute associated with an attribute value of a second attribute is stored in the recording medium, the CPU 2012 may retrieve, out of said plurality of entries, an entry with the attribute value of the first attribute specified that meets a condition, read the attribute value of the second attribute stored in said entry, and thereby obtaining the attribute value of the second attribute associated with the first attribute meeting a predetermined condition.

The programs or software module described above may be stored on the computer 2000 or in a computer-readable storage medium near the computer 2000. A recording medium such as a hard disk or RAM provided in a server system connected to a dedicated communication network or the Internet can be used as the computer-readable storage medium. The programs stored in the computer-readable storage medium may be provided to the computer 2000 via the network.

The program installed in the computer 2000 and causing the computer 2000 to function as the information processing apparatus 200 may instruct a processor such as the CPU 2012 to cause the computer 2000 to function as each unit of the information processing apparatus 200. The information processing written in these programs are read by the computer 2000 to cause the computer to function as each unit of the information processing apparatus 200, which is specific means realized by the cooperation of software and the various types of hardware resources described above. Then, these specific means implement operations or processing of information according to the intended use of the computer 2000 in the present embodiment, so that the information processing apparatus 200 is constructed as a specific information processing apparatus according to the intended use.

Various embodiments have been described with reference to the block diagram or the like. In the block diagram, each block may represent (1) a step of a process in which an operation is executed, or (2) each unit of the apparatus having a role in executing the operation. Specific steps and each unit may be implemented by a dedicated circuit, a programmable circuit supplied along with a computer-readable instruction stored on a computer-readable storage medium, and/or a processor supplied along with the computer-readable instruction stored on the computer-readable storage medium. The dedicated circuit may include a digital and/or analog hardware circuit, or may include an integrated circuit (IC) and/or a discrete circuit. The programmable circuit may include a reconfigurable hardware circuit including: logical AND, logical OR, logical XOR, logical NAND, logical NOR, and other logical operations; a memory element such as a flip-flop, a register, a field programmable gate array (FPGA), a programmable logic array (PLA), or the like; and so on.

The computer-readable storage medium may include any tangible device capable of storing an instruction executed by an appropriate device, so that the computer-readable storage medium having the instruction stored thereon constitutes at least a part of a product including an instruction that may be executed in order to provide means to execute an operation specified by a processing procedure or a block diagram. Examples of the computer-readable storage medium may include an electronic storage medium, a magnetic storage medium, an optical storage medium, an electromagnetic storage medium, a semiconductor storage medium, or the like. More specific examples of the computer-readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer-readable instruction may include either of source code or object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

The computer-readable instruction may be provided to a general-purpose computer, a special-purpose computer, or a processor or a programmable circuit of another programmable data processing apparatus, locally or via a local area network (LAN), a wide area network (WAN) such as the Internet or the like, and the computer-readable instruction may be executed in order to provide a means to execute operations specified by the described processing procedure or the block diagram. Examples of the processor include a computer processor, a processing unit, a microprocessor, a digital signal processor, a controller, a microcontroller, or the like.

While the embodiments of the present invention have been described, the technical scope of the invention is not limited to the above described embodiments. It is apparent to persons skilled in the art that various alterations and improvements can be added to the above described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10 program update system
12 base station
14 wireless access point
20 vehicle
70 terminal
80 external server
90 communication network
200 information processing apparatus
201 TCU
202 ECU
204 ECU
206 ECU
210 IVI
220 wireless communication unit
240 communication mode setting unit
230 communication mode discrimination unit
260 detection unit
250 report unit
270 storage unit
280 in-vehicle communication line
290 GNSS receiver
291 camera
294 FI
295 battery
297 display
298 MID
299 multimedia equipment
300 system area
301 first partition
302 second partition
310 data area
700, 710, 720, 730, 740 screen
702 UI button
2000 computer
2010 host controller
2012 CPU
2014 RAM
2020 input/output controller
2022 communication interface
2024 flash memory
2026 ROM
2040 input/output chip

What is claimed is:
1. An information processing apparatus mounted to transport equipment, the information processing apparatus comprising:

a processor configured to control download of a program installed in the information processing apparatus from an external server by a wireless communication, wherein:

the information processing apparatus has communication modes including a first communication mode in which the information processing apparatus connects to a neighboring wireless access point and performs a communication and a second communication mode in which the information processing apparatus functions as a wireless access point for neighboring radio equipment, the first communication mode and the second communication mode being mutually exclusive for execution;

the processor is configured to execute a discrimination of the communication mode when a power source of the transport equipment turns off; and when the processor discriminates that the communication mode is the second communication mode, the processor is configured to perform a switching from the second communication mode to the first communication mode and search for the neighboring wireless access point based on the first communication mode to attempt to connect to the neighboring wireless access point.

2. The information processing apparatus according to claim 1, wherein when the processor performs the switching from the second communication mode to the first communication mode and searches for the neighboring wireless access point based on the first communication mode to attempt to connect to the neighboring wireless access point, but fails to connect to the neighboring wireless access point, the processor is configured to perform a switching from the first communication mode to the second communication mode.

3. The information processing apparatus according to claim 1, wherein after the processor performs the switching from the second communication mode to the first communication mode and searches for the neighboring wireless access point based on the first communication mode to attempt to connect to the neighboring wireless access point, and establishes a connection to the neighboring wireless access point, when it is determined that the download of the program is not necessary, the processor is configured to perform a switching from the first communication mode to the second communication mode.

4. The information processing apparatus according to claim 1, wherein after the processor performs the switching from the second communication mode to the first communication mode, searches for the neighboring wireless access point based on the first communication mode, and establishes a connection to the neighboring wireless access point, when it is determined that the download of the program cannot be performed under a predetermined condition, the processor is configured to perform a switching from the first communication mode to the second communication mode.

5. The information processing apparatus according to claim 4, wherein:

the processor is configured to detect a remaining capacity of a battery for driving the information processing apparatus; and the predetermined condition includes that the remaining capacity of the battery which is detected by the processor is lower than a predetermined value.

6. The information processing apparatus according to claim 1, wherein when the processor performs the switching from the second communication mode to the first communication mode, searches for the neighboring wireless access point based on the first communication mode, and establishes a connection to the neighboring wireless access point, and the download of the program from the external server is completed, the processor is configured to perform a switching from the first communication mode to the second communication mode.

7. The information processing apparatus according to claim 1, wherein when the processor performs the switching from the second communication mode to the first communication mode, searches for the neighboring wireless access point based on the first communication mode, establishes a connection to the neighboring wireless access point, and starts the download of the program from the external server, but the download of the program from the external server is not completed within a predetermined period of time, the processor is configured to stop the download of the program and perform a switching from the first communication mode to the second communication mode.

8. The information processing apparatus according to claim 1, wherein the information processing apparatus is configured to obtain information to be displayed on a display unit mounted to the transport equipment from a mobile terminal based on the second communication mode.

9. The information processing apparatus according to claim 1, wherein when the download of the program is not completed, after the power source of the transport equipment turns on, the processor is configured to report that the download of the program is not completed.

10. The information processing apparatus according to claim 1, wherein:

the wireless communication is a wireless local area network communication; and the first communication mode is a station mode, and the second communication mode is an access point mode.

11. The information processing apparatus according to claim 10, wherein:

the information processing apparatus has a third communication mode in which a communication is performed using a mobile communication; and when the mobile communication is available, the program is downloaded using the mobile communication in a preferential manner over the wireless communication based on the second communication mode.

12. The information processing apparatus according to claim 1, wherein the transport equipment is a vehicle.

13. The information processing apparatus according to claim 2, wherein after the processor performs the switching from the second communication mode to the first communication mode and searches for the neighboring wireless access point based on the first communication mode to attempt to connect to the neighboring wireless access point, and establishes a connection to the neighboring wireless access point, when it is determined that the download of the program is not necessary, the processor is configured to perform a switching from the first communication mode to the second communication mode.

14. The information processing apparatus according to claim 2, wherein
after the processor performs the switching from the second communication mode to the first communication mode, searches for the neighboring wireless access point based on the first communication mode, and establishes a connection to the neighboring wireless access point, when it is determined that the download of the program cannot be performed under a predetermined condition, the processor is configured to perform a switching from the first communication mode to the second communication mode.

15. The information processing apparatus according to claim 14, wherein
the processor is configured to detect a remaining capacity of a battery for driving the information processing apparatus; and
the predetermined condition includes that the remaining capacity of the battery which is detected by the processor is lower than a predetermined value.

16. The information processing apparatus according to claim 2, wherein
when the processor performs the switching from the second communication mode to the first communication mode, searches for the neighboring wireless access point based on the first communication mode, and establishes a connection to the neighboring wireless access point, and the download of the program from the external server is completed, the processor is configured to perform a switching from the first communication mode to the second communication mode.

17. The information processing apparatus according to claim 2, wherein
when the processor performs the switching from the second communication mode to the first communication mode, searches for the neighboring wireless access point based on the first communication mode, establishes a connection to the neighboring wireless access point, and starts the download of the program from the external server, but the download of the program from the external server is not completed within a predetermined period of time, the processor is configured to stop the download of the program and perform a switching from the first communication mode to the second communication mode.

18. A transport equipment comprising:
the information processing apparatus according to claim 1.

19. An information processing method executed by an information processing apparatus mounted to transport equipment, the information processing apparatus downloading a program installed in the information processing apparatus from an external server by a wireless communication, the information processing apparatus having communication modes including a first communication mode in which the information processing apparatus connects to a neighboring wireless access point and performs a communication and a second communication mode in which the information processing apparatus functions as a wireless access point for neighboring radio equipment, the first communication mode and the second communication mode being mutually exclusive for execution, the information processing method comprising:
discriminating of the communication mode when a power source of the transport equipment turns off;
when the discriminating of the communication discriminates that the communication mode is the second communication mode, performing a switching of the communication mode from the second communication mode to the first communication mode; and
after the switching from the second communication mode to the first communication mode is performed, searching for the neighboring wireless access point based on the first communication mode to attempt to connect to the neighboring wireless access point.

20. A non-transitory computer-readable storage medium having stored thereon a program that causes a computer installed in transport equipment to download a program installed in the computer from an external server by a wireless communication,
the program installed in the computer causing the computer to:
discriminate a communication mode of the computer; and
execute a setting of the communication mode,
the communication mode having communication modes including a first communication mode in which the computer connects to a neighboring wireless access point and performs a communication and a second communication mode in which the computer functions as a wireless access point for neighboring radio equipment, the first communication mode and the second communication mode being mutually exclusive for execution,
the program installed in the computer causing the computer to:
execute a discrimination of the communication mode when a power source of the transport equipment turns off; and
perform, when the computer discriminates that the communication mode is the second communication mode, a switching from the second communication mode to the first communication mode, and search for the neighboring wireless access point based on the first communication mode to attempt to connect to the neighboring wireless access point.

* * * * *